(12) United States Patent
Ogasawara et al.

(10) Patent No.: US 7,453,791 B2
(45) Date of Patent: Nov. 18, 2008

(54) OPTICAL RECORDING MEDIUM HAVING A PLURALITY OF GUIDE TRACKS TRANSFER REGIONS

(75) Inventors: Masakazu Ogasawara, Tsurugashima (JP); Akihiro Tachibana, Tsurugashima (JP); Yoshihisa Kubota, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 789 days.

(21) Appl. No.: 11/001,648

(22) Filed: Dec. 2, 2004

(65) Prior Publication Data
US 2005/0157613 A1 Jul. 21, 2005

(30) Foreign Application Priority Data
Dec. 15, 2003 (JP) ............................. 2003-416806
Sep. 16, 2004 (JP) ............................. 2004-269401

(51) Int. Cl.
*G11B 7/24* (2006.01)
(52) U.S. Cl. .................................................. 369/275.4
(58) Field of Classification Search ........................ None
See application file for complete search history.

(56) References Cited

U.S. PATENT DOCUMENTS

| | | | |
|---|---|---|---|
| 7,170,661 B2 * | 1/2007 | Ogasawara et al. | 359/22 |
| 7,254,106 B2 * | 8/2007 | Ichihara et al. | 369/103 |
| 7,307,769 B2 * | 12/2007 | Ogasawara | 359/24 |
| 2005/0141067 A1 * | 6/2005 | Ogasawara et al. | 359/22 |
| 2006/0023577 A1 * | 2/2006 | Shinoda et al. | 369/44.23 |
| 2008/0013441 A1 * | 1/2008 | Oouchida | 369/275.4 |
| 2008/0037082 A1 * | 2/2008 | Ogasawara | 359/3 |
| 2008/0037083 A1 * | 2/2008 | Ogasawara | 359/3 |

FOREIGN PATENT DOCUMENTS

JP 11-311937 11/1999

* cited by examiner

*Primary Examiner*—Tan X Dinh
(74) *Attorney, Agent, or Firm*—Drinker Biddle & Reath LLP

(57) ABSTRACT

A recording medium has a recording layer capable of be performed in recording or reproducing of information with light irradiation and carried with a substrate. The recording medium includes a guide layer having guide tracks each followed by a light beam spot focused from an objective lens through the recording layer, the guide tracks disposed at a first pitch. The recording medium includes a guide track transfer region provided on the guide layer and having at least one line of a track arranged in parallel between the guide tracks adjacent to each other in the extending direction of the guide track so as to be in a direction perpendicular to the guide track within a range shorter than that of the guide track.

25 Claims, 18 Drawing Sheets

↔ P-POLARIZED LIGHT
⊙ S-POLARIZED LIGHT

2

20a

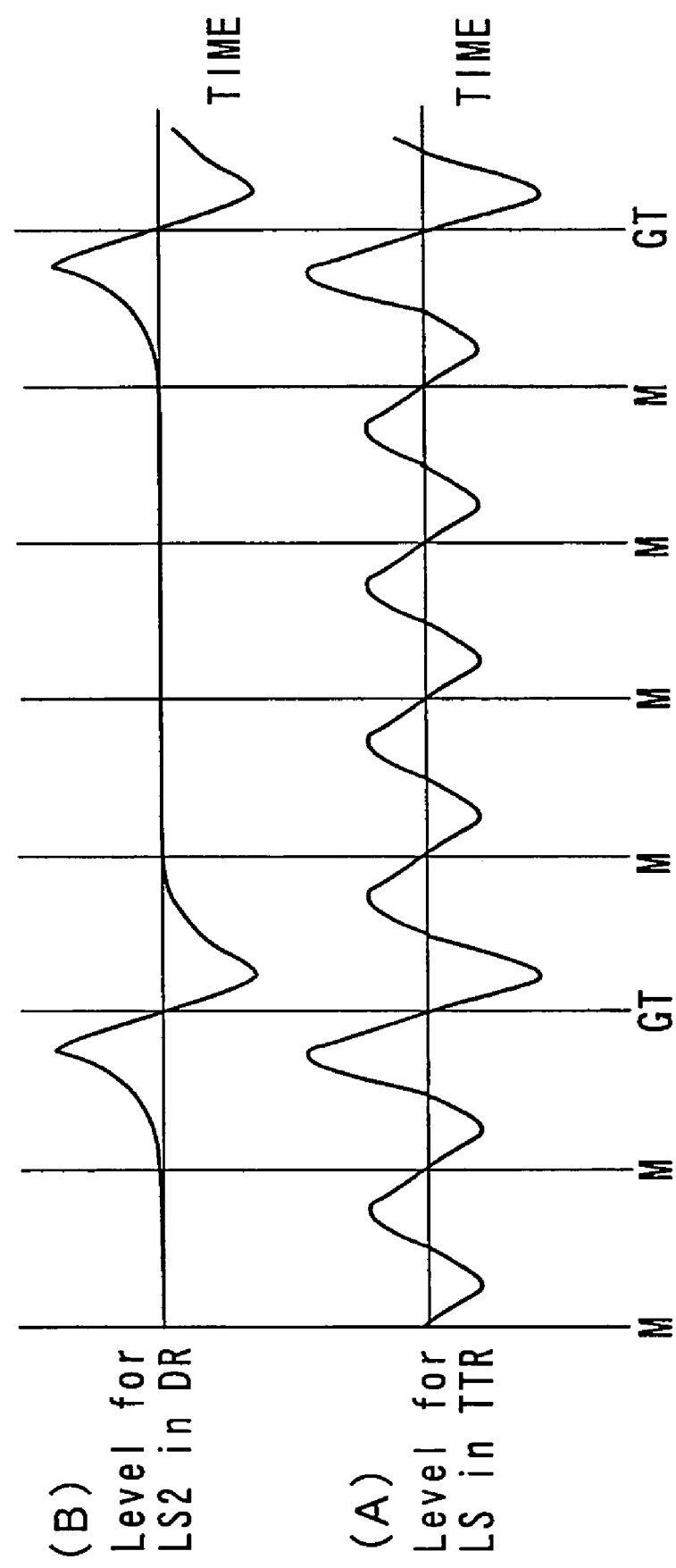

OPTICAL RECORDING MEDIUM HAVING A PLURALITY OF GUIDE TRACKS TRANSFER REGIONS

BACKGROUND OF THE INVENTION

1. Field of the Invention

The present invention relates to a recording medium on which information is optically recorded or reproduced, such as an optical disc, an optical card and the like, and more particularly, to a recording medium which has a recording layer irradiated with a light beam for recording or reproducing information, and a recording and reproducing method and a recording and reproducing device therefor.

2. Description of the Related Art

In the optical disc such as DVD (Digital Versatile Disc) and the like, information signal is recorded as changes in the reflectivity and the recording and reproducing are conducted. For example, there is a re-recordable optical disc having a recording layer with uneven pre-grooves or lands provided as guide tracks, in which, by using the irradiation of light beam, pits or the like are recorded as a mark changed in the reflectivity different form that of the surrounding. In the recording and the reproducing to and from the optical disc, the light beam is converged to the guide track to form a light spot, while the light spot follows the guide track (with a tracking servo control), light reflected and return from mark on the guide track is detected to reproduce the information signals.

To realize an information recording in a high density to the optical disc, attempts to minimize the light spot and to shorten each mark length and each track pitch still more. However, the narrowing of track pitch decreases the output level of the tracking error signal particularly a radial push-pull signal. This is a problem of a low signal level insufficient for the tracking servo control to be impracticable, namely one of obstructions to a high density information recording.

In addition, the hologram has drawn attention because of its ability to record two-dimensional data signals at a high density, in order to increase the density of recording information. The hologram is characterized by volumetrically recording a wavefront of light which carries recording information on a hologram recording medium made of a photosensitive material such as a photo-refractive material as a change in refractive index. For example, a recording and reproducing system which utilizes the hologram recording medium as a disc (hologram disc) has been developed (see Laid-open Japanese Patent Application Kokai No. 11-311937).

FIG. 1 shows part of a hologram disc of an air gap type. This hologram disc is comprised of a reflective substrate 221, a transparent substrate 222 facing a reflecting surface of the reflective substrate, and a hologram layer 225 combined with the transparent substrate 222 on the reflective substrate 221 side. The air gap with a predetermined thickness is disposed between the reflecting surface of the reflective substrate 221 and the hologram layer 225. In the hologram disc, pre-grooves are formed on the reflecting surface of the reflective substrate 221.

As shown in FIG. 2, the reflective film of the hologram disc has a reflective surface which is formed with servo areas 6 at predetermined angular intervals. There is a data area 7 in a sector area every between adjacent servo areas 6. A groove 201 (pre-groove) is formed per each track in the servo area 6 for the tracking servo control. On the other hand, the data area 7 has no groove. The conventional system forces the light spot LS to follow the pre-groove of the servo area 6 in the tracking servo control of the recording and reproducing of the hologram disc. During the passage of the light spot LS on the data area 6, the tracking servo control is not preformed, and the objective lens is fixed in the pickup device.

In the hologram recording system, a hologram disc with reference light which is converged on the reflective film through the recording layer as a spot, and the reference light reflected by the reflective film diverges to pass through the recording layer, and simultaneously, information light, which carries information to be recorded, is passed through the recording layer. In this way, in the recording layer, the reflected reference light interferes with the information light to form an interference pattern to volumetrically record hologram within the recording layer. The holograms of the interference pattern are recorded in the recording layer adjacent to each other, overlapping in sequence. Then, the reference light is irradiated to detect and demodulate reproduced light restored from each hologram to reproduce recorded information.

In general, the track pitch may be decided on the basis of the multiplicity of hologram. Therefore, the track pitch is wider in comparison with the spot diameter of the light beam that is servo controlled for the recording and reproducing of hologram. Thus, FIG. 2 shows an exemplary transfer of a light spot LS during the recording or reproducing of hologram. When the light spot LS transfers from the one track to the adjacent track in the radial direction, the tracking error signal is not output at all. Therefore, the light spot LS is derailed from the track after which the light spot should chase due to external interference, perturbations and the like. It is difficult to perform the tracking servo control of the objective lens.

On the other hand, if the track pitch is set to meet with the spot diameter of the light spot, then the multiplicity of hologram will increase, so that the light spot may erase adjacent holograms and signals, otherwise a cross-talk may occur during the reading. In addition, the recording medium having a narrow track pitch may bring about an unexpected situation that S/N of read out signal is deteriorated due to the influence of diffraction caused by the narrow guide track structure.

SUMMARY OF THE INVENTION

It is therefore an exemplary object of the present invention to provide a recording medium and a recording and reproducing method and a recording and reproducing device which enable stable recording or reproduction of data even with a wide track pitch.

A recording medium according to the present invention is a recording medium having a recording layer capable of be performed in recording or reproducing of information with light irradiation and carried with a substrate, characterized by including:

a guide layer having guide tracks each followed by a light beam spot focused from an objective lens through the recording layer, the guide tracks disposed at a first pitch; and a guide track transfer region provided on said guide layer and having at least one line of a track arranged in parallel between said guide tracks adjacent to each other in the extending direction of said guide track so as to be in a direction perpendicular to said guide track within a range shorter than that of said guide track.

A recording and reproducing method according to the present invention is a recording and reproducing method for a recording medium having a recording layer capable of be performed in recording or reproducing of information with light irradiation and carried with a substrate, characterized by including the steps of:

providing a recording medium including a guide layer having guide tracks each followed by a light beam spot focused from an objective lens through the recording layer, the guide tracks disposed at a first pitch, and a guide track transfer region provided on said guide layer and having at least one line of a track arranged in parallel between said guide tracks adjacent to each other in the extending direction of said guide track so as to be in a direction perpendicular to said guide track within a range shorter than that of said guide track;

moving the light beam spot within said guide track transfer region; and detecting a tracking error signal.

A recording device according to the present invention is a recording device for a recording medium having a recording layer capable of be performed in recording or reproducing of information with light irradiation and carried with a substrate, characterized by including:

a support portion supporting a recording medium including a guide layer having guide tracks each followed by a light beam spot focused from an objective lens through the recording layer, the guide tracks disposed at a first pitch, and a guide track transfer region provided on said guide layer and having at least one line of a track arranged in parallel between said guide tracks adjacent to each other in the extending direction of said guide track so as to be in a direction perpendicular to said guide track within a range shorter than that of said guide track; and a detector portion for moving the light beam spot within said guide track transfer region to detect a tracking error signal.

A reproducing device according to the present invention is a reproducing device for a recording medium having a recording layer capable of be performed in recording or reproducing of information with light irradiation and carried with a substrate, characterized by including;

a support portion supporting a recording medium including a guide layer having guide tracks each followed by a light beam spot focused from an objective lens through the recording layer, the guide tracks disposed at a first pitch, and a guide track transfer region provided on said guide layer and having at least one line of a track arranged in parallel between said guide tracks adjacent to each other in the extending direction of said guide track so as to be in a direction perpendicular to said guide track within a range shorter than that of said guide track; and a detector portion for moving the light beam spot within said guide track transfer region to detect a tracking error signal.

BRIEF DESCRIPTION OF THE DRAWINGS

FIGS. 21 and 22 are partial cross-sectional views each showing the track structure of a hologram disc according to another embodiment of the present invention;

FIG. 24 is a graph showing the tracking error signals during the recording and reproducing operation obtained from a hologram disc according to another embodiment of the present invention.

DETAILED DESCRIPTION OF THE INVENTION

In the following, embodiments of the present invention will be described with reference to the drawings.

<Recording Medium>

Figure 1:
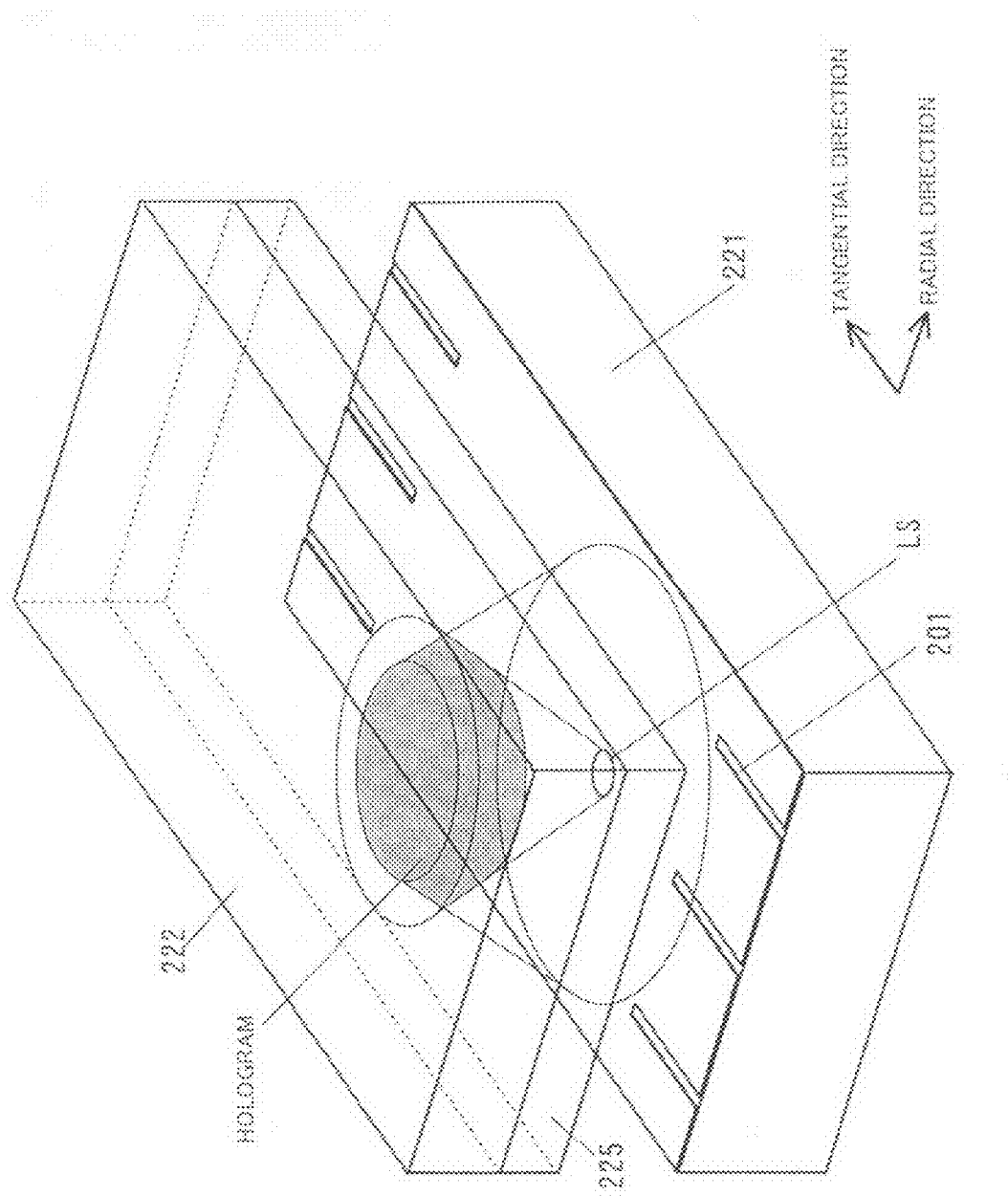
FIG. 1 is a partial perspective view generally showing the track structure of a conventional hologram disc.
Figure 2:
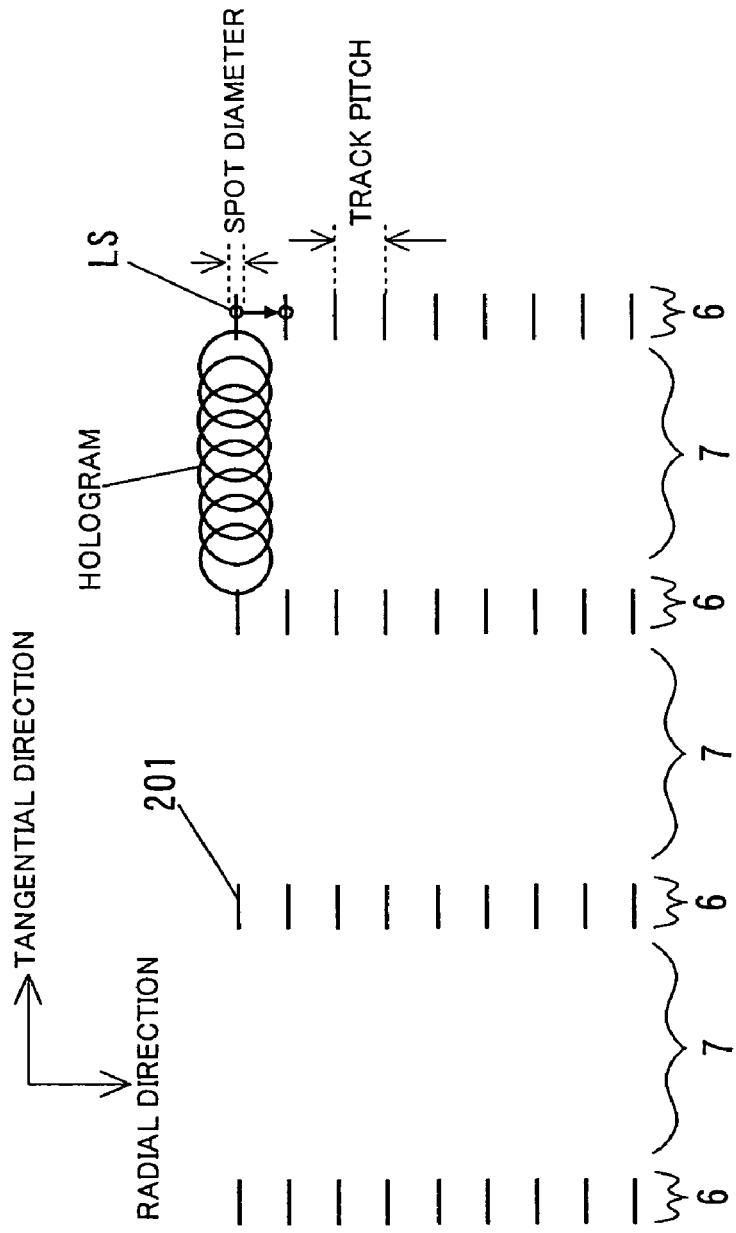
FIG. 2 is a partial plan view generally showing the track structure of a conventional hologram disc.
Figure 3:
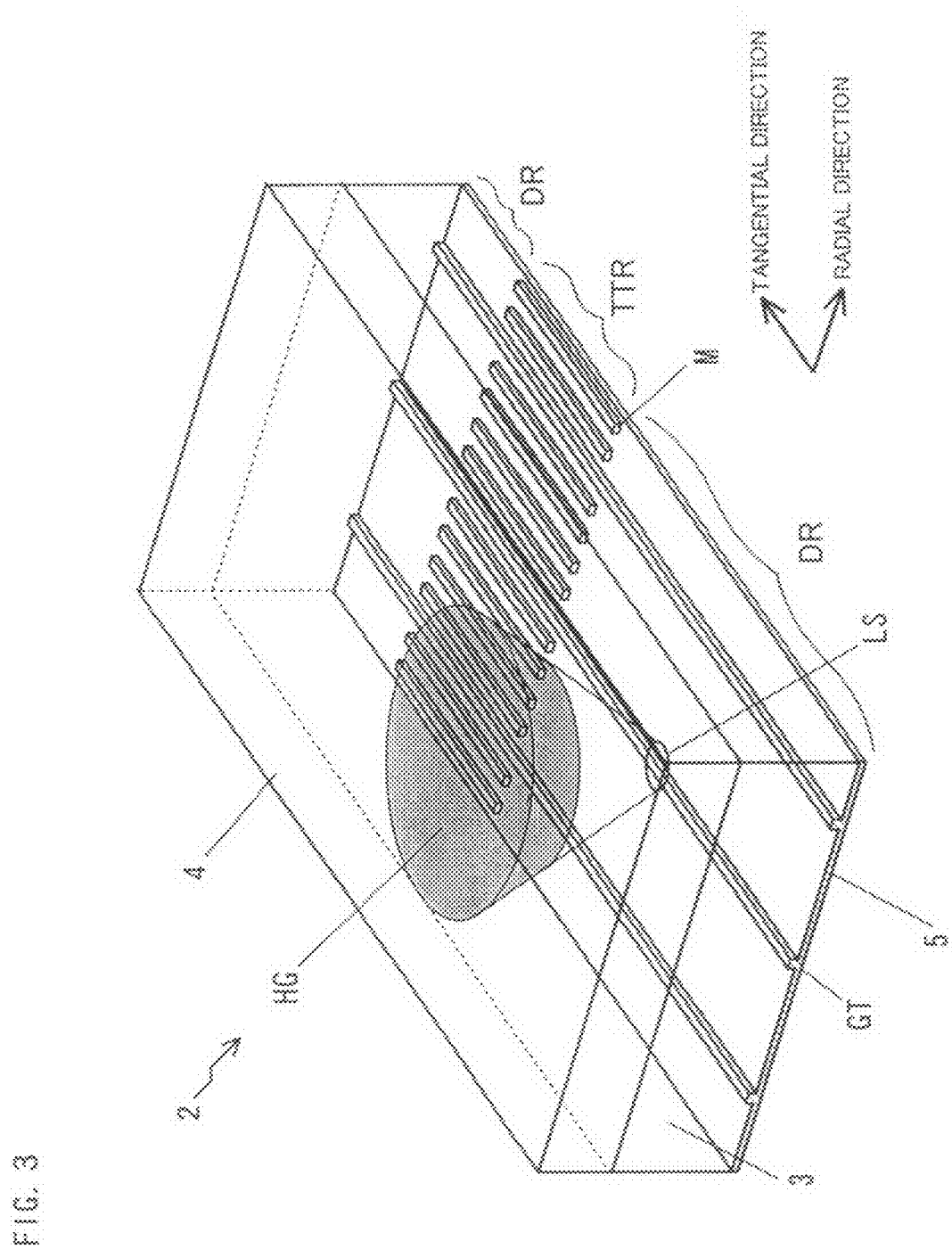
FIG. 3 is a partial perspective view generally showing the track structure of a hologram disc according to one embodiment of the present invention.

FIG. 3 shows a disk-shaped recording medium according to an exemplary embodiment i.e., hologram disk.

A hologram disk 2 comprises a disk-shaped substrate 3 made of an optically transparent material, and a recording layer 4 carried on a main surface of the substrate and made of a photo-sensitive material. For enabling information to be recorded or reproduced with light which passes through the recording layer 4, a photo-refractive material, a hole burning material, a photo-chromic material, or the like is used as a photo-sensitive material, of which the recording layer 4 is made, for preserving an optical interference pattern. A reflective layer 5 is laminated on the opposite side of the substrate 3 from the main surface on which the recording layer 4 is laminated. The substrate 3 functions as a separation layer interposed between the recording layer 4 and reflective layer 5. Further, an optically transparent cover layer (not shown) can be disposed on the outer surface of the recording layer 4.

At the interface of the substrate 3 with the reflective layer 5, grooves are formed and extend without intersection, as a plurality of guide tracks GT. The guide tracks T are formed spirally or concentrically on the substrate with respect to the center thereof, or in a plurality of cut spiral arcs. The interface functions as a guide layer on which the tracks are formed. The guide tracks are formed for conducting a tracking servo control, and holograms HG are recorded on the recording layer 4 over the guide track GT. This is because the tracking servo circuit forces a light beam LS to follow the guide tracks T on the reflective layer 5 during recording and reproduction.

The tracking servo control is conducted by driving an objective lens by an actuator in accordance with a detected signal, using a pickup which includes a light source for emitting a light beam, an optical system including an objective lens for converging the light beam on the reflective layer 5 as a light spot and leading its reflected light to a photo-detector, and the like. The diameter of the light spot is set to be narrowed down to a value determined by the wavelength of the light beam and the numerical aperture (NA) of the objective lens (a so-called diffraction limit which is, for example, 0.82 $\lambda$/NA ($\lambda$=wavelength), but is determined only by the wavelength of light and the numerical aperture when aberration is sufficiently small as compared with the wavelength). In other words, the light beam radiated from the objective lens is used such that it is focused when the reflective layer lies at the position of its beam waist. The width of the grooves is determined as appropriate in accordance with the output of the photo-detector which receives the reflected light from the light spot, for example, a push-pull signal.

Figure 4:
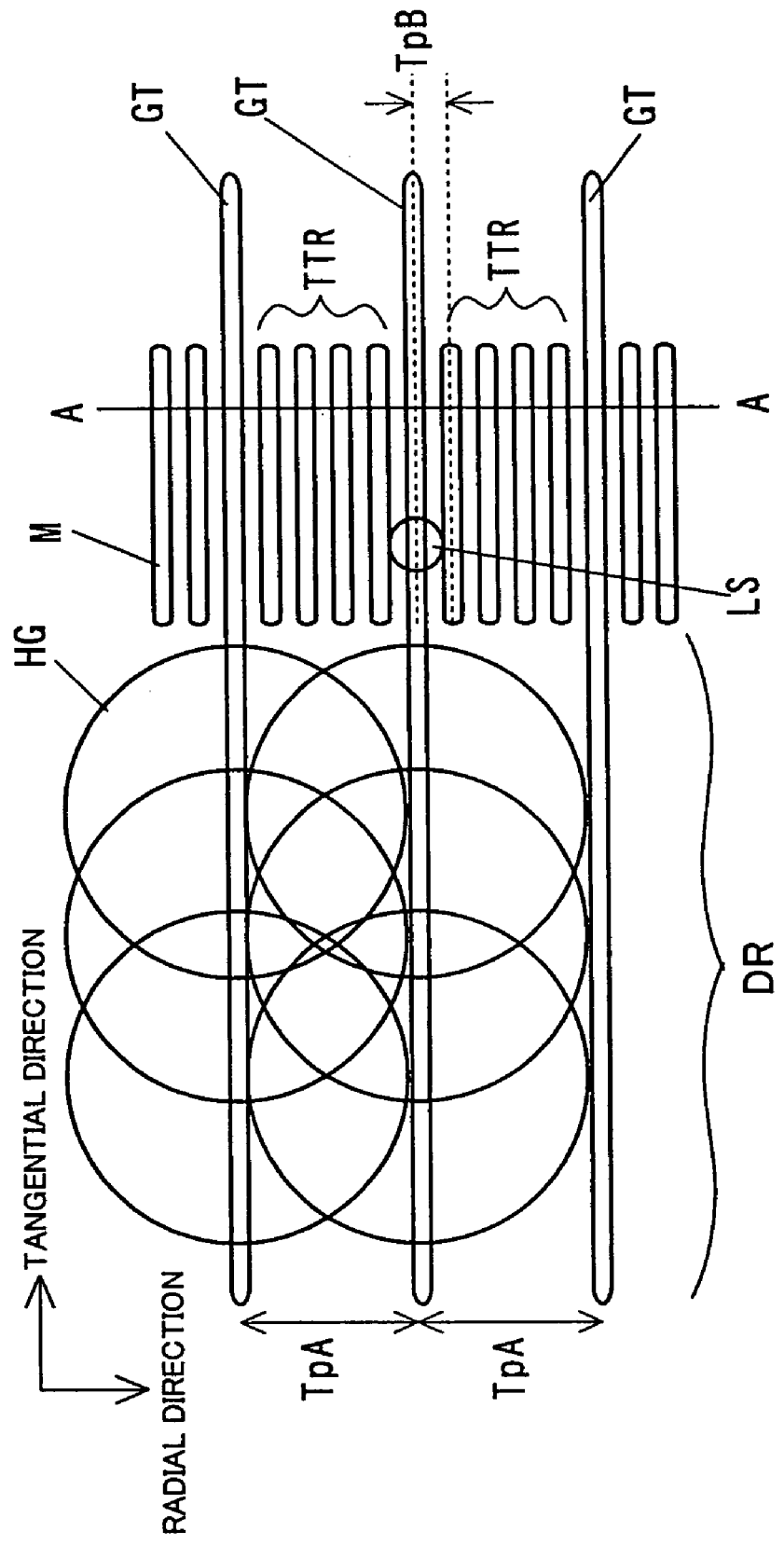
FIGS. 4 and 5 are partial plan views each generally showing a hologram disc according to one embodiment of the present invention.

As shown in FIG. 4 of a partial plan view showing the guide track structure, a track pitch (i.e., first pitch) of the guide tracks GT on the reflective layer 5 is set as a predetermined distance of a first value TpA larger than 4/3 times of the diameter of the irradiated light beam spot. If the width of the groove is larger than 1/3 times of the diameter of the light beam spot, then one ore track descried later may be disposed between adjacent guide tracks. Further, a track pitch TpA is determined by the multiplicity of holograms HG in a radial direction recorded above the spot of the light beam LS. The multiplicity of holograms is determined by the characteristics of the recording medium, NA of the objective lens, and the like. For example, an article of D. Psaltis, M. Levene, A. Pu, G. Barbastathis and K. Curtis; "Holographic storage using shift multiplexing" OPTICS LETTERS Vol. 20, No. 7 (Apr. 1, 1995) pp. 782-784 shows a shift multiplex recording scheme using a spherical reference wave in that, when plural holograms are repeatedly written at nearly the same position, multiplicity (a traveling distance of shift multiplex recording, i.e., a minimum distance by which adjacent holograms can be independently separated) is determined by the wavelength of signal light, the distance between an objective lens and a recording medium, the thickness of the recording medium, an angle at which the signal light intersects with the spherical reference wave, and the numerical aperture of the objective lens. In general, the multiplicity of hologram recording is set a value so much wider than a light spot determined by the NA of the objective lens, the diffraction limit, and the wavelength of irradiated light. In the shift multiplex recording of medium, when a subsequently recorded hologram is superimposed on a previously recorded hologram substantially at the same position, part of the previously recorded hologram is erased by the subsequently recorded hologram. Therefore the multiplicity is dependent on the ratio of superposed volume of hologram HG.

In the present embodiment, as shown in FIGS. 3 and 4, the guide track transfer region TTR is provided on the guide layer i.e., the reflective layer 5 and is disposed between the guide tracks GT adjacent to each other in the direction perpendicular to the guide track GT (radial direction). The guide track transfer region TTR includes 4 lines of the short grooves (tracks) M each being shorter than the guide track GT. Every short groove M is extended in the extending direction (tangential direction) of the guide track. The short grooves M are arranged in parallel within a range shorter than that of the guide tracks GT therebetween. The guide track transfer region TTR may include at least one line of the short grooves. The short grooves M is disposed, of course, with a second track pitch TpB (second value) smaller than the first value TpA. According to this structure of the guide track GT and the guide track transfer region TTR, there is no periodical track structure for the light beam spot in the hologram recording region of the data region DR. Thus little influence diffracted light caused from the guide track decreases an impediment to the recording and reproducing.

The second track pitch TpB is set a value grater than the diffraction limit defined by the NA of the objective lens, and the wavelength of irradiated light for servo controls of the objective lens (focus servo, the tracking servo and the like) in the recording and reproducing of hologram. In other words, the short grooves (tracks) of the guide track transfer region TTR are formed with a pitch larger than the spot diameter of the light beam.

According to the guide track structure of the hologram disc, a so-called track jump technology can be used for the transfer of the light spot from one track to the adjacent track to be record. The tracking error signal can be detected at the guide track transfer region TTR one after another, although sporadically detected other than the guide track transfer region.

Figure 5:
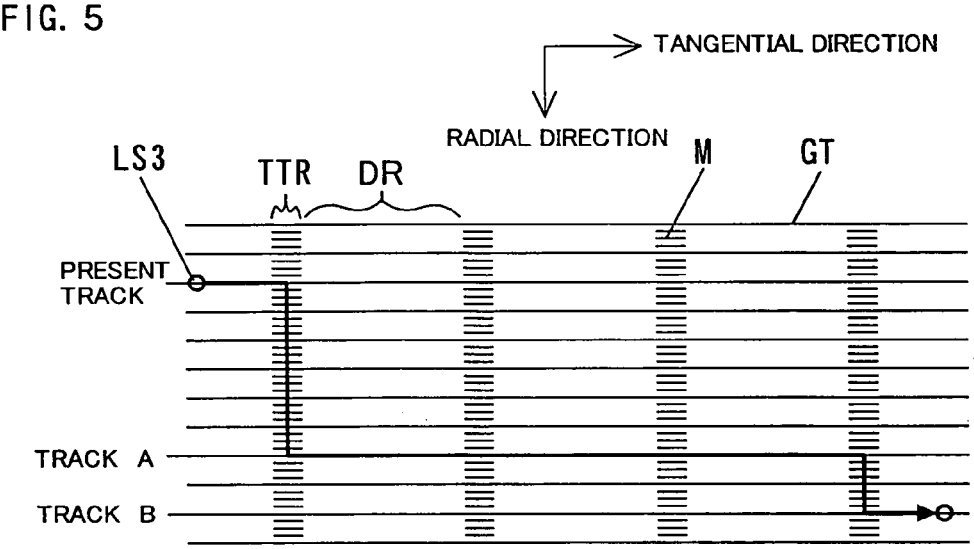
Figure 6:
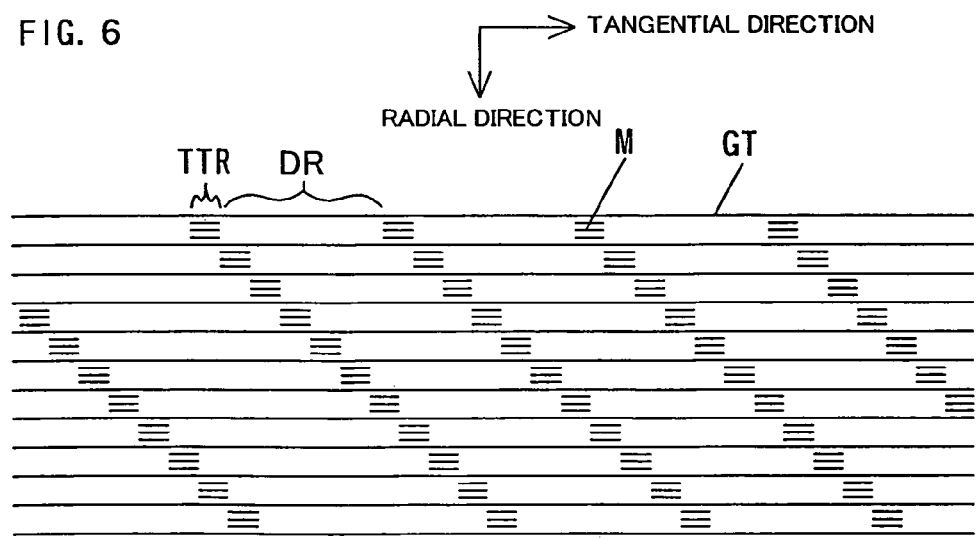
FIGS. 6-8 are partial plan views each generally showing a hologram disc according to other embodiment of the present invention.

As shown in FIG. 5, the guide track transfer region TTR and the data region Dr are alternately arranged in the extending direction of the guide track GT on the hologram disc 2. Each guide track transfer region TTR partitions the data region DR. In the hologram disc 2, the guide track transfer regions TTR are arranged along the disc radial direction. As shown in FIG. 6 of the other embodiment, the hologram disc 2 may have a structure so that the guide track transfer regions TTR are unequally disposed to the data regions DR and shifted from the radial direction.

Figure 7:
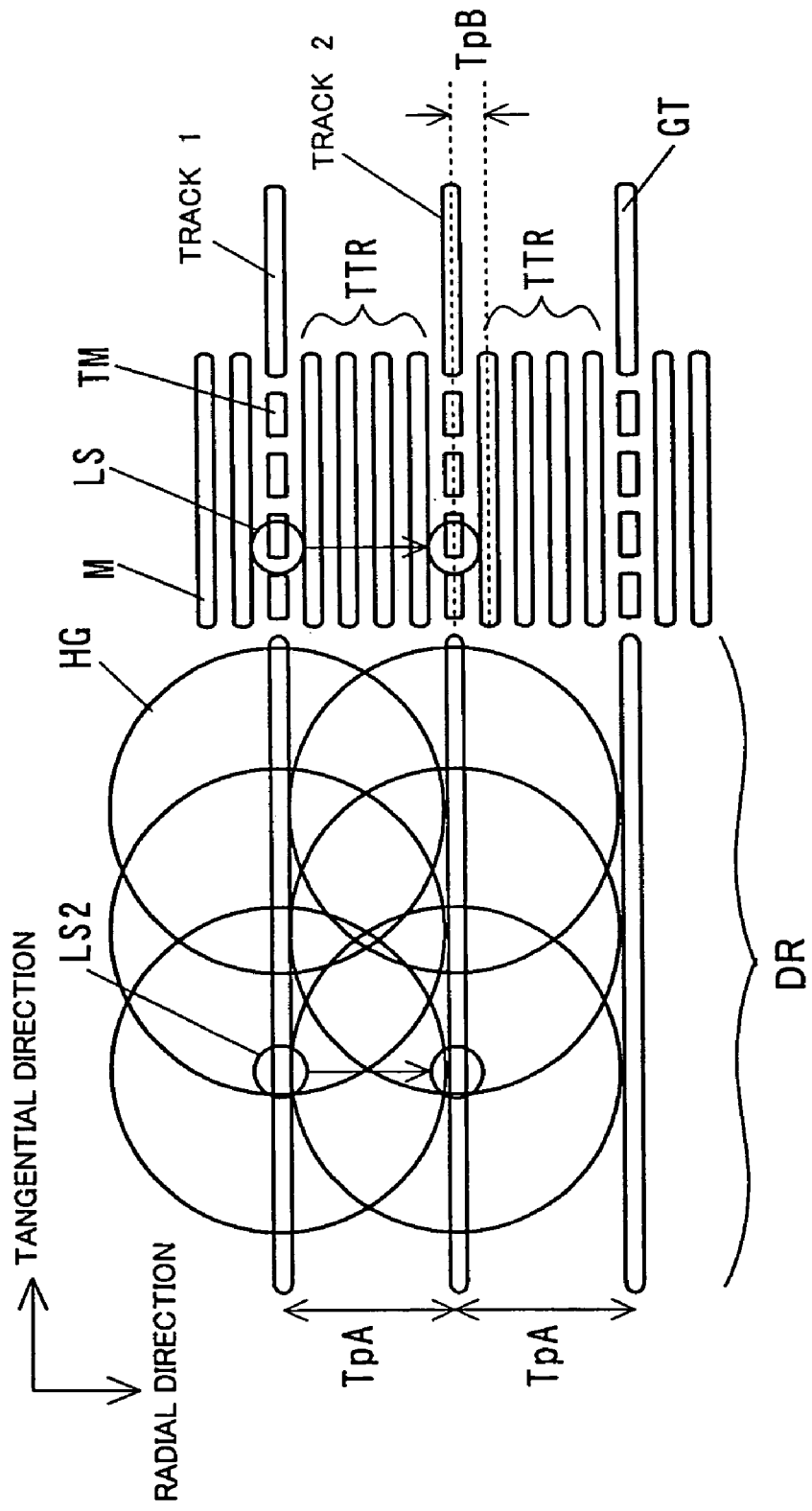

In a still other embodiment of hologram disc, a mark indicating predetermined information may be formed adjacent to the guide track transfer region TTR. As shown in FIG. 7, a track mark TM indicating existence of the guide track transfer region TTR may be disposed between the guide tracks GT adjacent to each other in the extending direction of the guide track GT. In other words, information (track mark TM) showing the guide track transfer region as address information previously recorded on the guide track. Such information recording mark may be a pit-shape of recess and protrusion or mark of a black and white pattern. Since the track marks TM of information are readable by using a light beam spot for servo control, the acquisition of address information is simultaneous with the discrimination of the guide track transfer region from the other.

Figure 8:
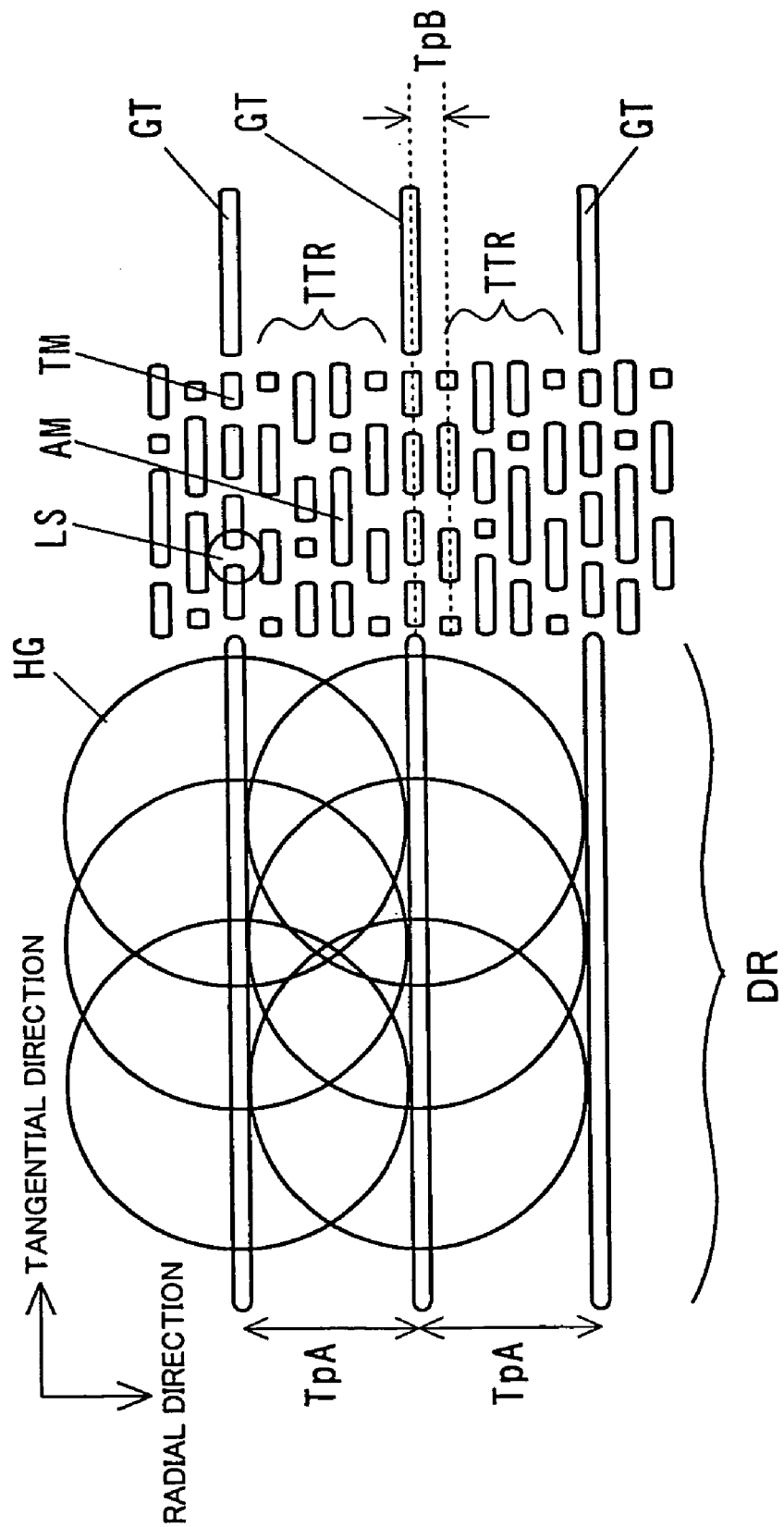

Besides, FIG. 8 shows still another embodiment. The hologram disc is the same as the recording medium shown in FIG. 7 except signals (marks) indicating the track number used for the track jump during the transfer of spot are recorded to settle the spot on the track. Since the guide track transfer region TTR has the address marks AM showing the track number and the like of address information, the device can know the present position of the light spot at what track in the guide track transfer region TTR. The device recognizes the guide track transfer region by the address information recorded on the guide track transfer region.

Figure 9:
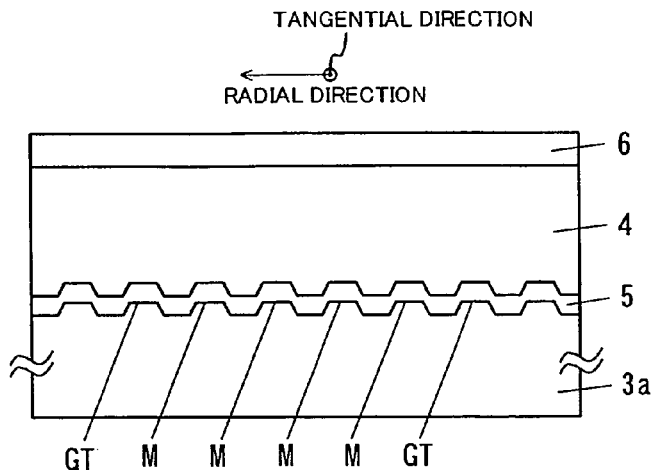
FIG. 9 is a schematic partial cross-sectional view showing a hologram disc according to another embodiment of the present invention.

Although the embodiment mentioned above has a structure of the hologram recording medium in that the guide layer (the reflective layer 5) and the recording layer 4 are layered via the separation layer (the substrate 3), as shown in FIG. 9, a further embodiment of the hologram recording medium without a separation layer may be employed. This embodiment has a structure in that the reflective layer 5, the recording layer 4 and the transparent cover layer 6 are layered in order on the substrate 3a with the guide track GT, the short grooves M and the like. Moreover, for one of modifications of the hologram recording medium, the separation layer may be provided between the reflective layer 5 and the recording layer 4.

<Hologram Recording and Reproducing Apparatus>

Figure 10:
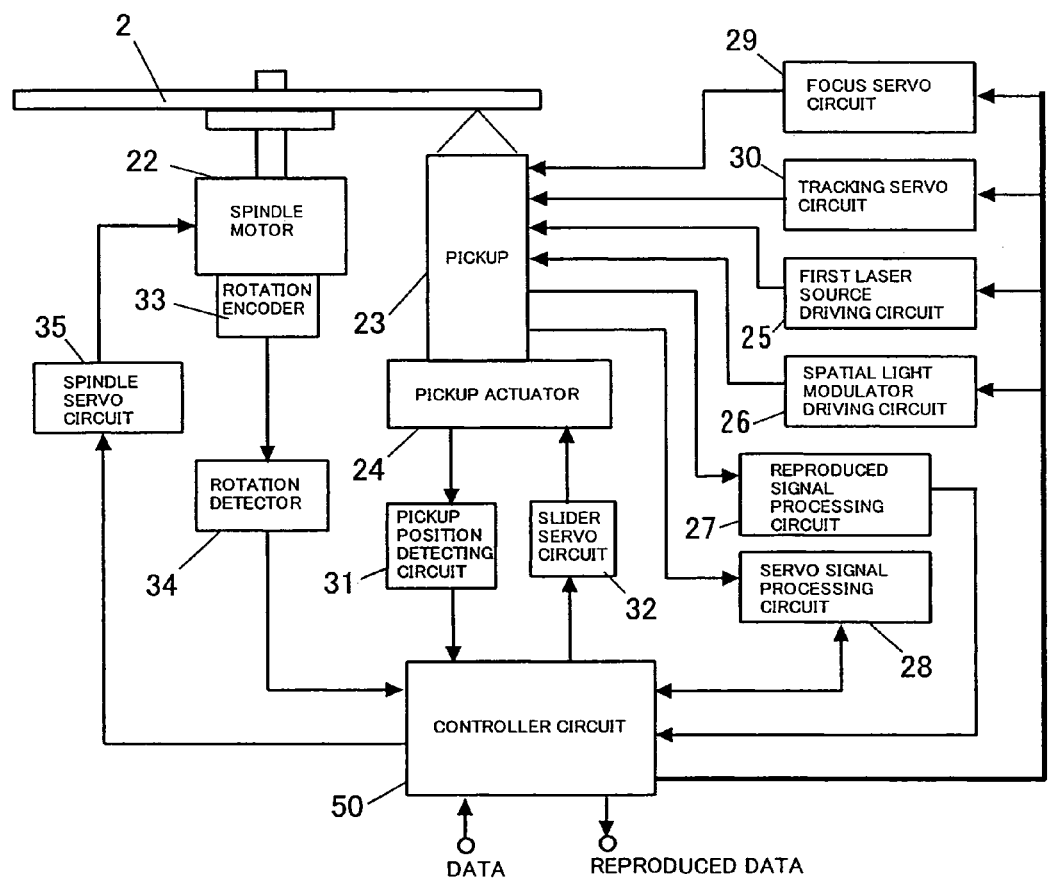
FIG. 10 is a block diagram generally illustrating the configuration of a recording and reproducing apparatus for recording or reproducing information on a hologram disc according to one embodiment of the present invention.
Figure 11:
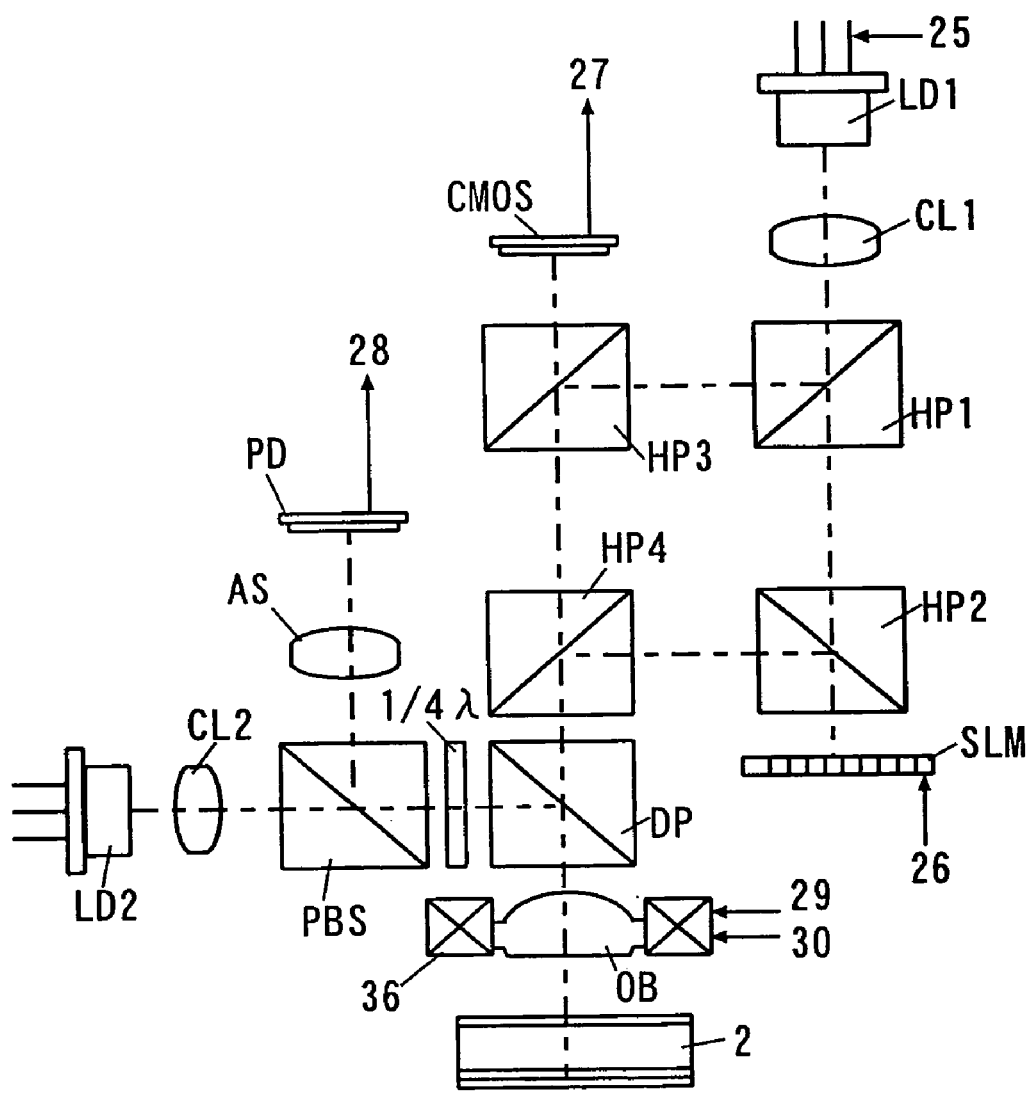
FIGS. 11 to 13 are schematic diagrams generally showing a pickup of a recording and reproducing apparatus for recording and reproducing information to and form a hologram disc according to one embodiment of the present invention.
Figure 12:
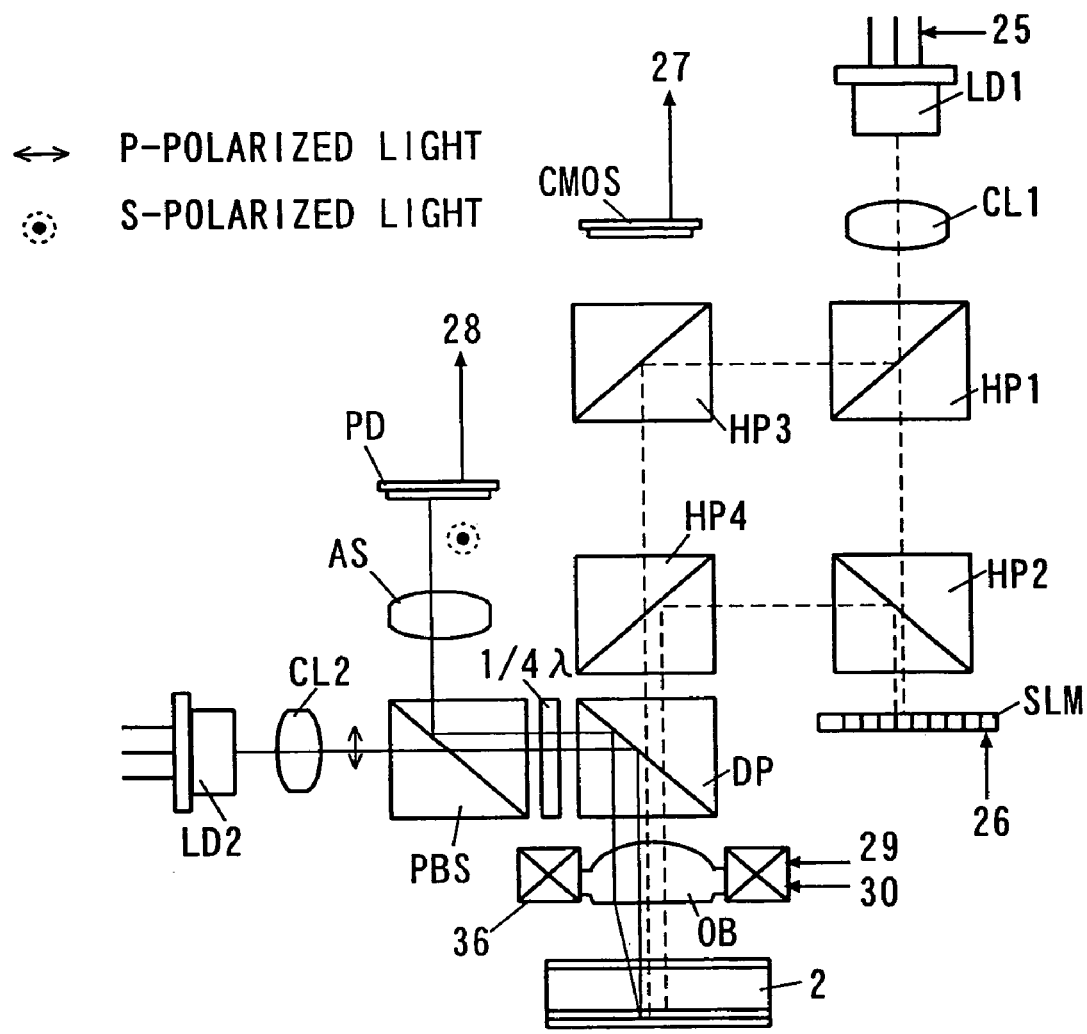
Figure 13:
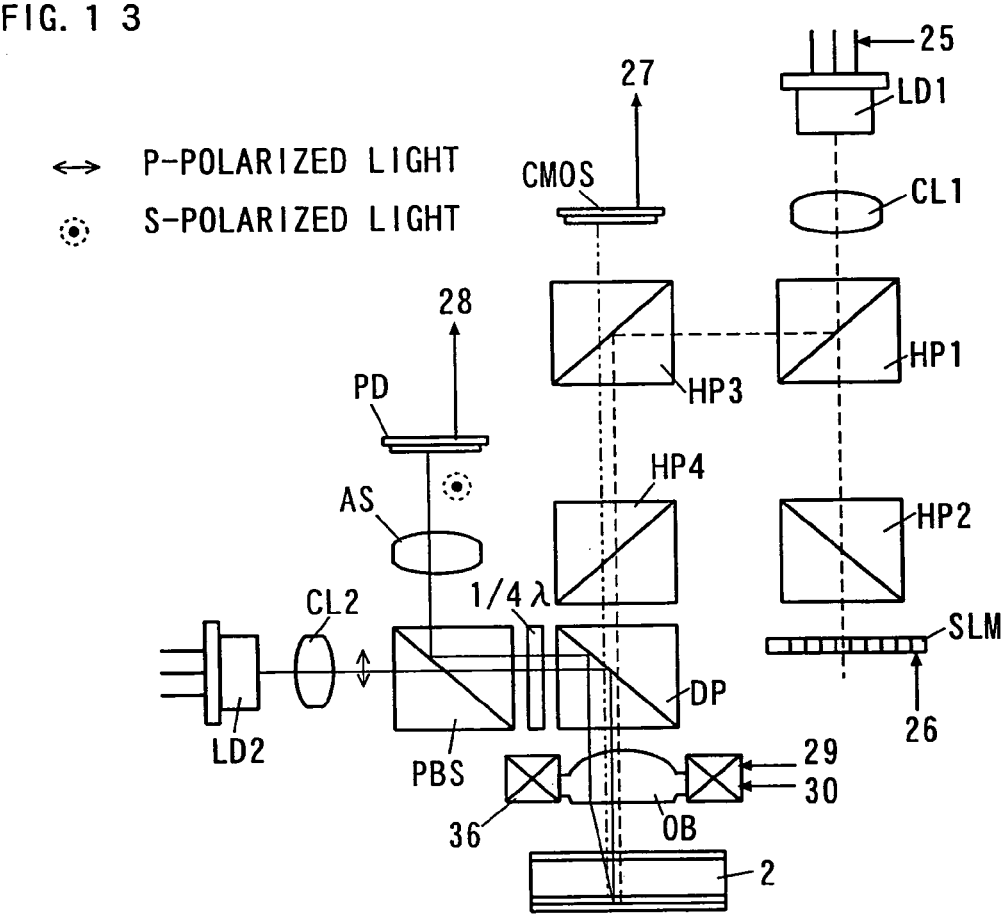

FIG. 10 shows the general configuration of a recording and reproducing apparatus for recording or reproducing information to or from a hologram disc to which the present invention is applied, and FIGS. 11-13 show the general configuration of a pickup of the recording and reproducing apparatus.

The hologram recording and reproducing apparatus of FIG. 10 comprises a spindle motor 22 for rotating the hologram disc 2 through a turn table; a pickup 23 for reading signals from the hologram disc 2 with light beams; a pickup actuator 24 for holding and moving the pickup 23 in the radial direction; a first laser source driving circuit 25; a spatial light modulator driving circuit 26; a reproduced signal processing circuit 27; a servo signal processing circuit 28; a focus servo circuit 29; a tracking servo circuit 30; a pickup position detecting circuit 31 connected to the pickup actuator 24 for detecting a position signal of the pickup; a slider servo circuit 32 connected to the pickup actuator 24 for supplying a predetermined signal to the pickup actuator 24; an rotation encoder 33 connected to the spindle motor 22 for detecting a rotational speed signal of the spindle motor; a rotation detector 34 connected to the encoder for generating a rotating position signal of the hologram disc 2; and a spindle servo circuit 35 connected to the spindle motor 22 for supplying a predetermined signal thereto.

The hologram recording and reproducing apparatus has a controller circuit 50 connected to the first laser source driving circuit 25, spatial light modulator driving circuit 26, reproduced signal processing circuit 27, servo signal processing circuit 28, focus servo circuit 29, tracking servo circuit 30, pickup position detecting circuit 31, slider servo circuit 32, rotation encoder 33, rotation detector 34, and spindle servo circuit 35. The controller circuit 50 relies on signals from these circuits to conduct focus and tracking servo controls associated with the pickup, reproduced position (radial position) control, and the like through these drivers. The controller circuit 50, which is based on a microcomputer containing a variety of memories for generally controlling the apparatus, generates a variety of control signals in response to input operations by the user on an operation panel (not shown) and a current operating situation of the apparatus, and is connected to a display (not shown) for displaying an operating situation and the like to the user. The controller circuit 50 also processes data entered from the outside, which should be recorded, such as encoding of the data, and supplies predetermined signals to the spatial light modulator driving circuit 26 to control a recording operation. Furthermore, the controller circuit 50 restores data recorded on a hologram disc through demodulation and error correction processing, based on signals from the reproduced signal processing circuit 27. In addition, the controller circuit 50 decodes the restored data to reproduce information data which is output as reproduced information data.

The pickup 23 shown in FIG. 11 is made up of a recording and reproduction optical system which comprises a first laser source LD1 for recording and reproducing holograms, a first collimator lens CL1, a first half mirror HP1, a second half mirror prism HP2, a spatial light modulator SLM, a reproduced signal detector including an image sensor CMOS comprised of a CCD, an array of complementary metal oxide film semiconductor devices or the like, a third half mirror prism HP3, and a fourth half mirror prism HP4; a servo system which comprises a second laser source LD2 for servo-controlling (focus, tracking) the position of the light beam with respect to the hologram disc 2, a second collimator lens CL2, a ¼ wave plate ¼λ, a polarization beam splitter PBS, an astigmatism element AS such as a cylindrical lens, and a servo signal detector including a photodetector PD; and a common system which comprises a dichroic prism DP and an objective lens OB. These systems are placed substantially on the common plane except for the objective lens OB. Half mirror surfaces of the first, third and fourth half mirror prisms HP1, HP3, and HP4 are disposed to be parallel with one another. In a normal direction of these half mirror planes, the half mirror plane and the separation planes of the second half mirror prism HP2 and the dichroic prism DP and polarization beam splitter PBS are in parallel with one another. These optical parts are disposed such that the optical axes (one-dot chain lines) of light beams from the first and second laser sources LD1 and LD2 extend to the recording and reproducing optical system and servo system, respectively, and substantially match in the common system.

Further, the pickup 23 comprises an objective lens actuator 36 which is made up of a focusing section for moving the objective lens in the optical axis direction, and a tracking section for moving the objective lens in a radial direction of the disc perpendicular to the optical axis.

The first laser source LD1 is connected to the first laser source driving circuit 25, and has its output adjusted by the first laser source driving circuit 25 such that the intensity of an emitted light beam is increased for recording and decreased for reproduction.

The spatial light modulator SLM has a function of electrically transmitting or blocking part or all of incident light with a liquid crystal panel or the like having a plurality of pixel electrodes divided in a matrix shape. The spatial light modulator SLM, which is connected to the first laser source driving circuit 25, modulates and reflects an light beam so as to have a polarization component distribution based on page data to be recorded (two-dimensional data such as bright and dark dot pattern or the like on a plane) from the spatial light modulator driving circuit 26 to generate signal light.

The reproduced signal detector including the image sensor CMOS is connected to the reproduced signal processing circuit 27.

The photodetector PD is connected to the servo signal processing circuit 28, and has the shape of light receiving element divided for focus and tracking servo generally used for optical discs. The servo scheme is not limited to an astigmatism method, but can employ a push-pull method. The output signal of the photodetector PD, such as a focus error signal and a tracking error signal is supplied to the servo signal processing circuit 28.

In the servo signal processing circuit 28, a focusing driving signal is generated from the focus error signal, and is supplied to the focus servo circuit 29 through the controller circuit 50. The focus servo circuit 29 drives the focusing section of the objective lens actuator 36 mounted in the pickup 23, so that the focusing section operates to adjust the focus position of an optical spot irradiated to the hologram disc.

Further, in the servo signal processing circuit 28, a tracking driving signal is generated from a tracking error signal, and supplied to the tracking servo circuit 30. The tracking servo circuit 30 drives the tracking section of the objective lens actuator 36 mounted in the pickup 23 in response to the tracking driving signal, and the tracking section displaces the position of the optical spot irradiated to the hologram disc in the radial direction of the disc by an amount corresponding to the driving current carried by the tracking driving signal.

The controller circuit 50 generates a slider driving signal based on a position signal from the operation panel or the pickup position detecting circuit 31 and the tracking error signal from the servo signal processing circuit 28, and supplies the slider driving signal to the slider servo circuit 32. The slider servo circuit 32 moves the pickup 23 in the radial direction of the disc in response to a driving current carried with the slider driving signal by the pickup actuator 24.

The rotation encoder 33 detects a frequency signal indicative of a current rotating frequency of the spindle motor 33 for rotating the hologram disc 2 through the turn table, generates a rotational speed signal indicative of the spindle rotational signal corresponding thereto, and supplies the rotational speed signal to the rotation detector 34. The rotation detector 34 generates a rotational speed position signal which is supplied to the controller circuit 50. The controller circuit 50 generates a spindle driving signal which is supplied to the spindle servo circuit 35 to control the spindle motor 22 for driving the hologram disc 2 to rotate.

<Method of Recording and Reproducing Hologram>

Description will be made on a recording and reproducing method for recording or reproducing information by irradiating a hologram disc with an light beam using the hologram recording and reproducing apparatus described above.

During recording, as shown in FIG. 12, coherent light having a predetermined intensity from the first laser source LD1 is separated into a reference beam and a signal beam by the first half mirror HP1 (both the beams are indicated by broken lines and are shifted from the optical axis for explaining the optical path).

The signal beam transmits the second half mirror prism HP2, and impinges on the spatial light modulator SLM along the normal of the reflective surface. The signal light modulated in a predetermined manner by and reflected from the spatial light modulator SLM again impinges on the second half mirror prism HP2 and directs to the fourth half mirror prism HP4.

The reference beam is reflected by the third half mirror prism HP3, and directs to the fourth half mirror prism HP4.

The reference light and the signal light are combined using the fourth half mirror prism HP4. The two combined light beams pass through the dichroic prism DP, and are converged on the hologram disc 2 by the objective lens OB for recording a hologram.

During reproduction, on the other hand, light is separated into a reference beam and a signal beam by the first half mirror HP1, in a manner similar to the recording, as shown in FIG. 13, however, holograms are reproduced only with the reference beam. By bringing the spatial light modulator SLM into a non-reflective state (light-permeative state), only reference light from the third half mirror HP3 passes through the dichroic prism DP and objective lens OB, and impinges on the hologram disc 2.

Since reproduced light (two-dot chain line) generated from the hologram disc 2 transmits the objective lens OB, dichroic prism DP, fourth half mirror prism HP4, and third half mirror prism HP3, and impinges on the image sensor CMOS. The image sensor CMOS delivers an output corresponding to an image formed by the reproduced light to the reproduced signal processing circuit 27 which generates a reproduced signal that is supplied to the controller circuit 50 for reproducing recorded page data. An image forming lens may be provided between the third half mirror prism HP3 and the image sensor CMOS.

During both recording and reproduction, the second laser source DL2 for servo control emits coherent light at a different wavelength from the first laser source LD1, as shown in FIGS. 12 and 13. The servo light beam (thin solid line) from the second laser source DL2 is P-polarized light (double-head arrow indicating the parallelism to the drawing sheet) which is led along an optical path for servo detection including the second collimator lens CL2, polarization beam splitter PBS and ¼ wave plate ¼λ, but is combined with the signal beam and reference beam by the dichroic prism DP immediately before the objective lens OB. The servo light beam, after reflected by the dichroic prism DP, is converged by the objective lens OB, and impinges on the hologram disc 2. Return light of the servo light beam reflected from the hologram disc 2 back to the objective lens Ob and then transformed by the ¼ waveplate ¼λ into S-polarized light (a black circle surrounded by a broken-line circle indicative of being perpendicular to the drawing sheet) which impinges on a light receiving surface of the servo photodetector PD along the normal thereof through the polarization beam splitter PBS and astigmatism element AS.

Figure 14:
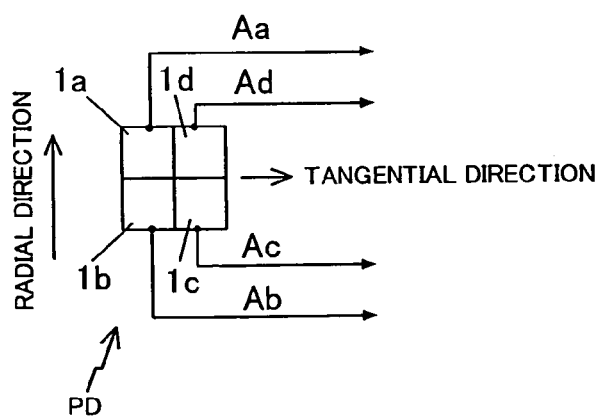
FIG. 14 is a plan view showing a photodetector in the pickup of the recording and reproducing apparatus for recording and reproducing information to and from a hologram disc according to one embodiment of the present invention.

Here, for recording and reproducing holograms, a servo control is conducted for positioning with the hologram disc 2 using the servo light beam. With the astigmatism method, the photodetector PC comprises light receiving elements $1a$-$1d$ having a light receiving surface equally divided into four for receiving a beam, for example, as shown in FIG. 14. The directions in which the photodetector PD is divided correspond to the radial direction of the disc and a tangential direction of the guide tracks. The photodetector PD is set such that a focused light spot appears to be a circle centered at the intersection of lines which divide the photodetector PD into the light receiving elements $1a$-$1d$.

In accordance with output signals of the respective light receiving elements $1a$-$1d$ of the photodetector PD, the servo signal processing circuit 28 generates an RF signal Rf and a focus error signal. When the signals of the light receiving elements $1a$-$1d$ are labeled Aa-As, respectively, in this order, the RF signal Rf is calculated by $Rf=Aa+Ab+Ac+Ad$, the focus error signal FE is calculated by $EF=(Aa+Ac)-(Ab+Ad)$, and the tracking error signal THE is calculated by $THE=(Aa+Ad)-(Ab+Ac)$. These error signals are supplied to the controller circuit 50.

Next, there will be described the tracking error signal and the track jump operation by using, for example, the displacements of the positions of the light spots LS, LS2 shown in FIG. 7 from the track 1 to the track 2 in the disc radial direction in the recording and reproducing of the hologram disc.

The controller circuit 50 receives a track jump command from the operation panel and the like and searches the track mark TM of the track 1 irradiated with the light beam at the present time. The controller circuit sustains the tracking servo control in the present track 1 until the signal of the track mark TM to be detected is provided again. At the time of detection of the signal of the track mark TM, the irradiated light spot LS is moved along the guide track transfer region TTR. Namely, the track jump signal is provided to the tracking servo circuit 30 in response to the track mark TM signal and then the tracking servo circuit 30 provides an oscillation driving voltage to the objective lens actuator 36 to move the objective lens OB over the guide track transfer region TTR and shift the light spot LS in the disc radial direction by the second pitch to make the light spot LS cross the short grooves (the tracks) M. In FIG. 7, since four lines of the short grooves M are formed between the adjacent guide tracks 1 and 2, the light spot LS may transfer to the adjacent track 2 by providing five driving signals repeatedly.

Figure 15:
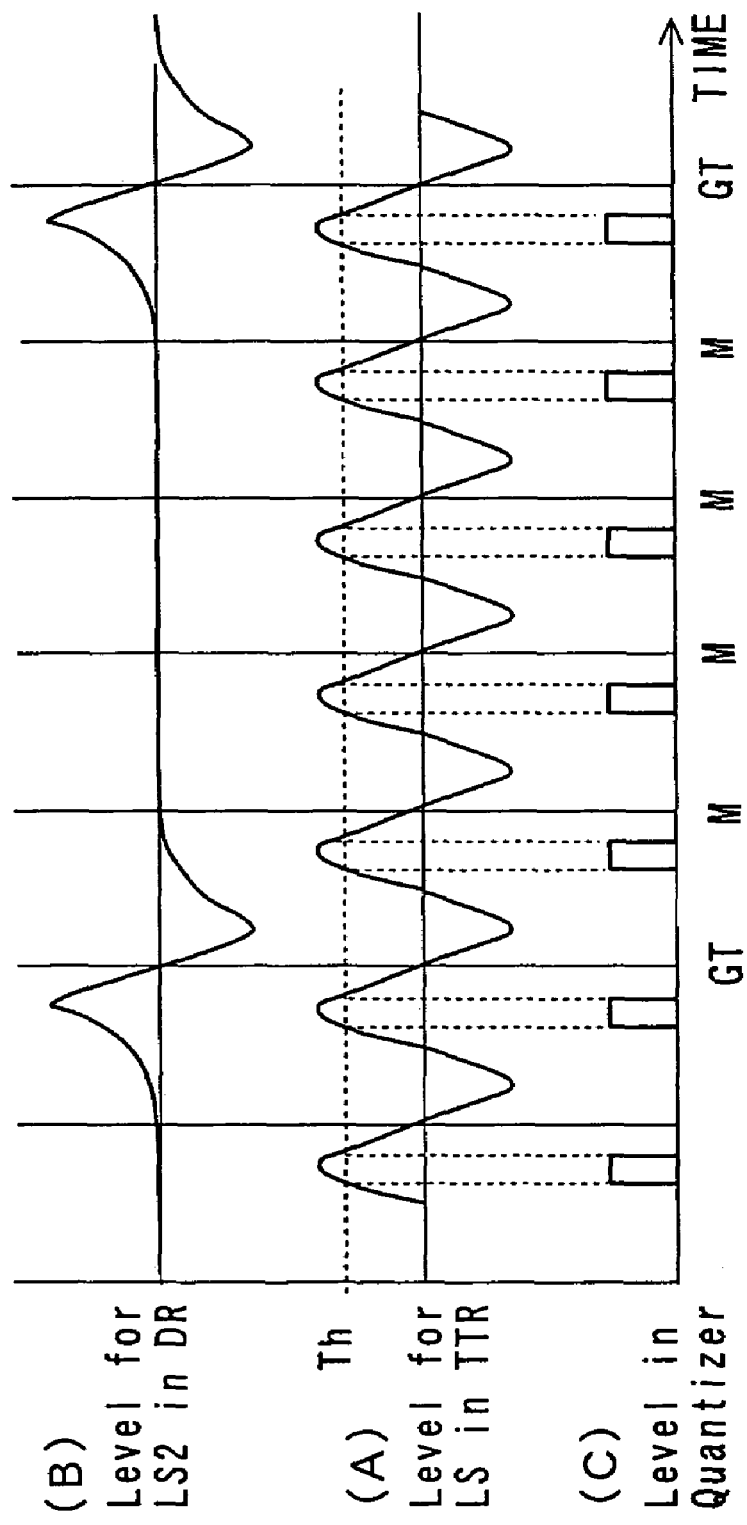
FIG. 15 is a graph showing the tracking error signals during the recording and reproducing operation obtained from a hologram disc according to one embodiment of the present invention.
Figure 16:
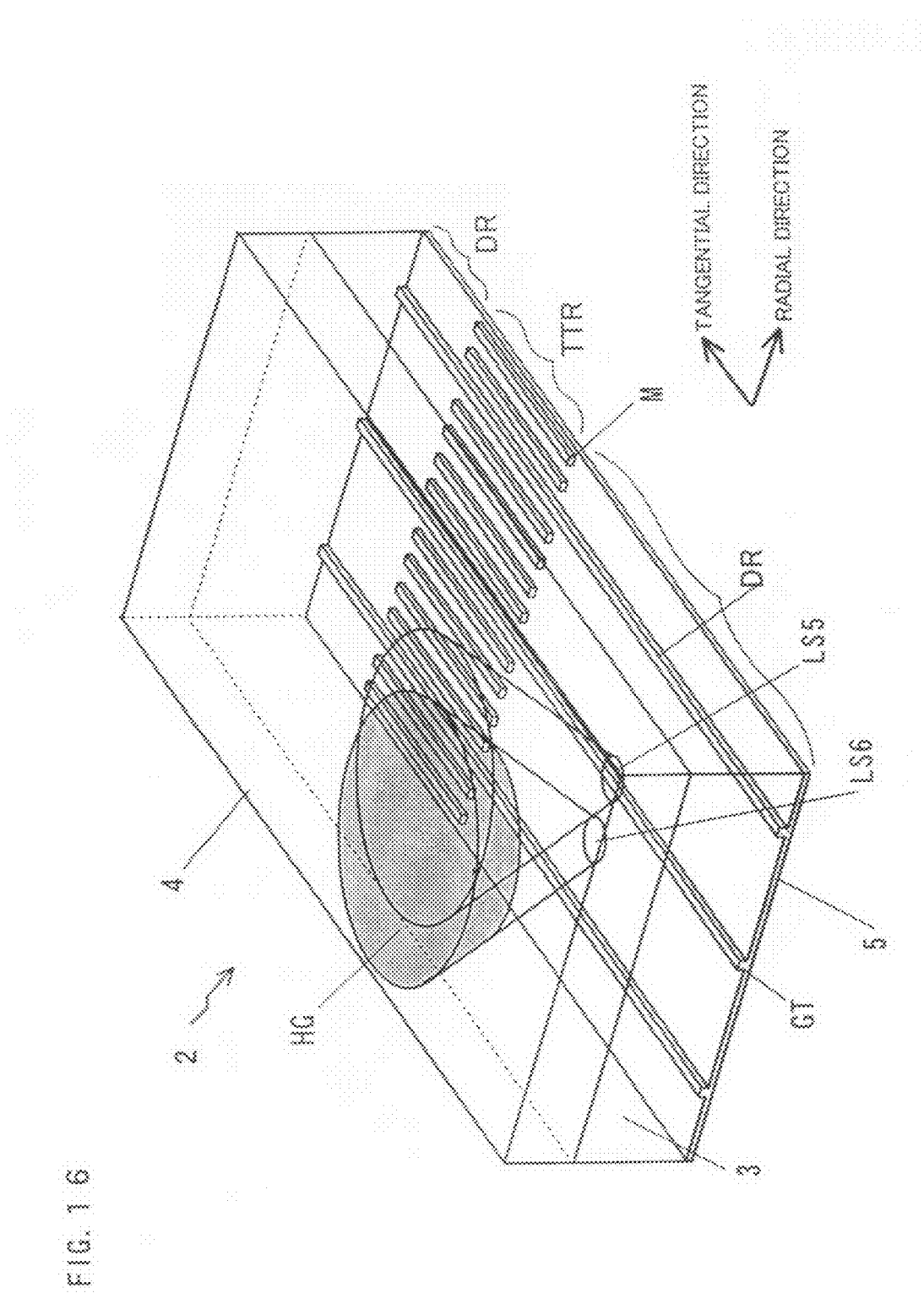
FIG. 16 is a partial perspective view generally showing the track structure of a hologram disc according to another embodiment of the present invention.

FIG. 15A shows changes of tracking error signals obtained through a series of the track jump operations of the light spot Ls during the passage of the guide track transfer region TTR by using the pickup of the recording and reproducing device shown in FIG. 10. By the way, FIG. 15B shows the tracking error signals caused by the light spot LS2 during the track jump operation at the data region DR.

The controller circuit 50 includes a binarization circuit (quantizer) to binarize the tracking error signals as shown in FIG. 15A. The binarization circuit generates tracking error signals that are pulse signals consisted of pulse waves of logic level "1" having a signal level larger than the predetermined level Th and of logic level "0" smaller than the same. In other words, every when the irradiated light spot LS crosses the short grooves (tracks) M, the peaks and adjacent of the tracking error signals of FIG. 15A are beyond the predetermined level Th and thus the binarization circuit generates the pulse signals 0 or 1 shown in FIG. 15C repeatedly. The output of the binarization circuit is provided to an edge counter installed in the controller circuit 50 to count the front edges of the pulse signals.

The calculation of the short grooves M in the guide track transfer region TTR is effective in a case there is some distance from the present guide track to the target guide track. The controller circuit 50 acquires data of passage time of the guide track transfer region TTR on the basis of signals provided from the pickup position detecting circuit 31 and the rotation detector 34. Therefore, on the basis of the counted value of the short grooves M, the controller circuit 50 predicts timings of the track jump signals for crossing a plurality of guide tracks to relay the guide tracks on the way from the present guide track to the target guide track. The prediction of the controller circuit enables to prevent the light spot LS from exceeding the width of the guide track transfer region TTR in the tangential direction and from slipping away to the data region DR in the track jump operation step.

FIG. 5 shows an exemplary embodiment in which the light spot LS3 transfers to the target track B far from the present track so as to start the track jump operation at the nearest guide track transfer region TTR. Before straying off to the data region DR, the light spot LS3 track-jumps to the track A on the way, and then track-jumps to the track B at the third guide track transfer region TTR. In this case, the controller circuit 50 computes a predicted value not to deviate from the guide track transfer region TTR on the basis of the number of tracks leading to the target track and TOC (table of contents) information previously acquired from the hologram disc. The controller circuit 50 compares the predicted value with the counted value provided from the edge counter and judges and then judges whether the counted value of the edge counter is equal to the predicted value or not per at the predetermined clock. According to the result, the controller circuit 50 provides the track jump command to the tracking servo circuit 30 (and or the slider servo circuit 32).

The present embodiment includes the data region Dr with a comparatively wide track pitch in which the hologram recording is preformed and the guide track transfer region TTR having the short grooves with a comparatively narrow track pitch in which the track jump is preformed. Therefore, the present embodiment facilitates to transfer smoothly the light spot to the adjacent guide track and improves the random access operation for the recording information.

Still Further Embodiments

The axis of the servo light beam passing through the second laser source LD2, the second collimator lens CL2 and the like shown in FIGS. 12 and 13 may be shifted from the co-axis of the reference light and the signal light caused by the first laser source LD1 as a modification from the pickup of the foregoing recording and reproducing device. In this case, only the light spot LS5 of the servo light beam is controlled on the guide track GT in the tracking servo control and, at the same time the light spots LS6, i.e., the reference light and the signal light are irradiated onto a mirror portion between the adjacent guide tracks to perform the hologram recording at the recording layer 4 above the light spots LS6.

Figure 17:
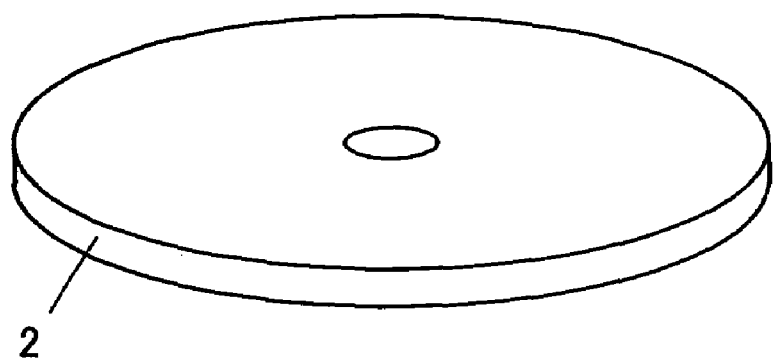
FIG. 17 is a perspective view showing a hologram disc according to the embodiment of the present invention.
Figure 18:
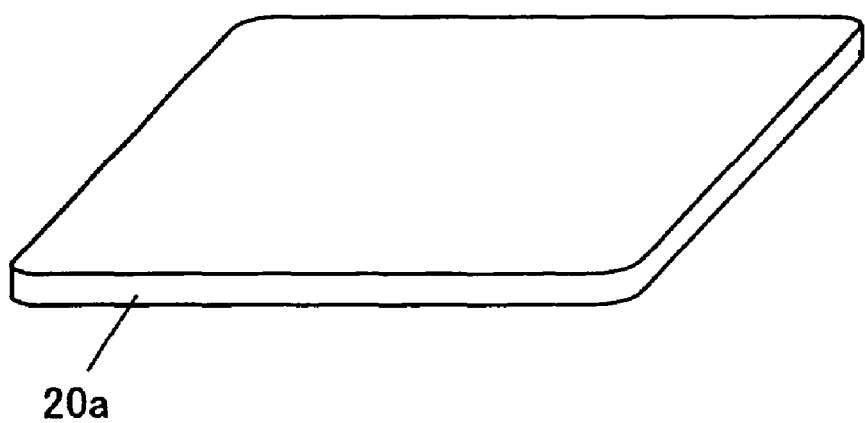
FIG. 18 is a perspective view showing a hologram optical card according to another embodiment of the present invention.

Besides, though the foregoing embodiment includes the hologram disc 2 as shown in FIG. 17 as a recording medium, the shape of the recording medium is not limited to a disk. For example, the embodiment includes as shown in FIG. 18 an optical card 20a of a rectangle parallel flat board made of plastics and the like and having. In such optical card, the guide track may be formed on the substrate spirally or spiroarcually or concentrically with respect to the center e.g., of gravity of the substrate. Further, the guide track may be formed in parallel on the substrate. In addition, the substrate may be the same as the foregoing, the reflective layer, the recording layer and the transparent cover layer are layered in order on the substrate with the guide track, the short grooves.

Figure 19:
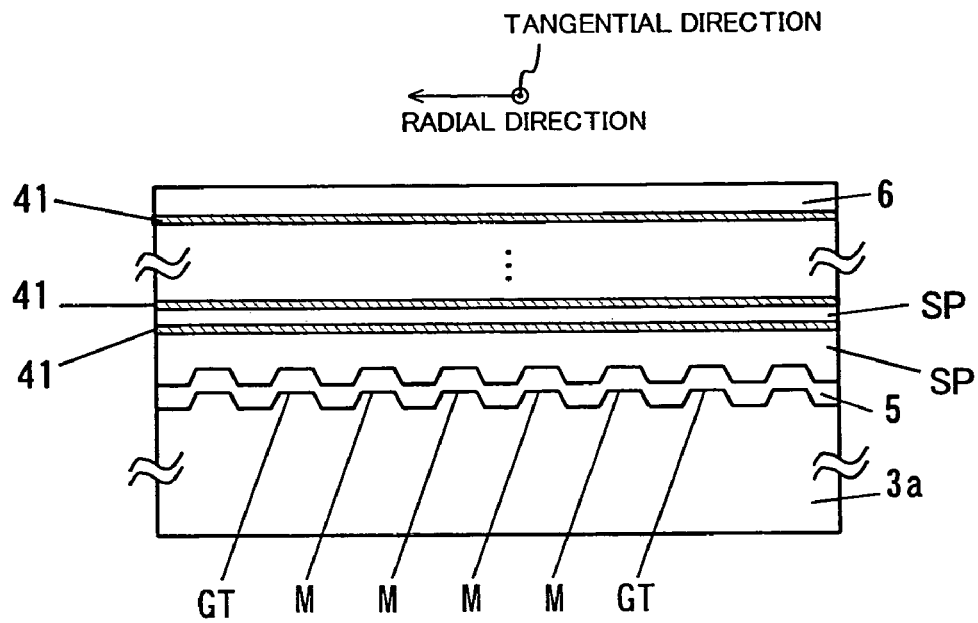
FIG. 19 is a schematic partial cross-sectional view showing a hologram disc according to another embodiment of the present invention.

In the foregoing embodiment, the hologram recording medium made of a photosensitive material is exemplified to store the optical interference pattern, the hologram recording medium. In addition to that, the recording layer material may employ a phase change material, organic dye and the like. The embodiment includes write-once or re-writable recording medium in which the changes of reflectivity in the recording layer are used for the recording and reproducing of information. FIG. 19 shows another embodiment of the recording medium in which a multi-layer structure is formed on the disk substrate 3a having the guide track GT, the short grooves M and the like. The guide layer (reflective layer) 5, the multi-layer structure consisting of the spacer layer SP and the recording layers 41 each having a predetermined thickness alternately layered to one another each other, and the transparent cover layer 6 are stacked in order on the substrate 3a.

In the embodiment described above, while the focus servo and tracking servo are based on the astigmatism method, a known method such as a three-beam method may be employed without limiting to the astigmatism method.

Still Further Other Embodiments

Figure 20:
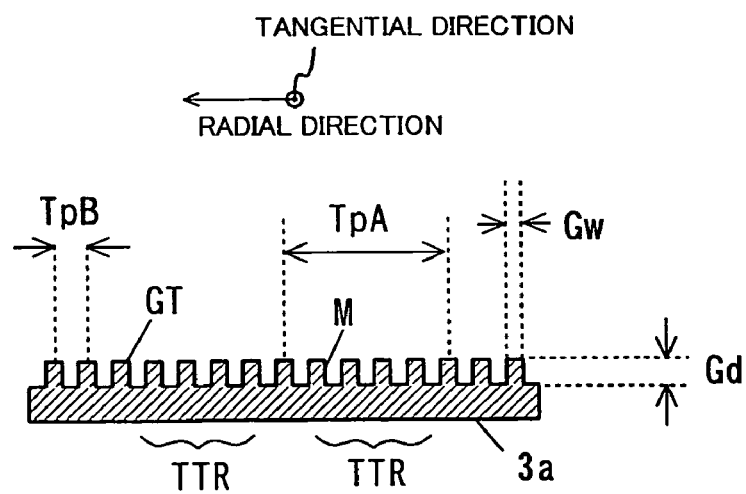
FIG. 20 is a partial cross-sectional view taken with AA line of FIG. 4.
Figure 2:
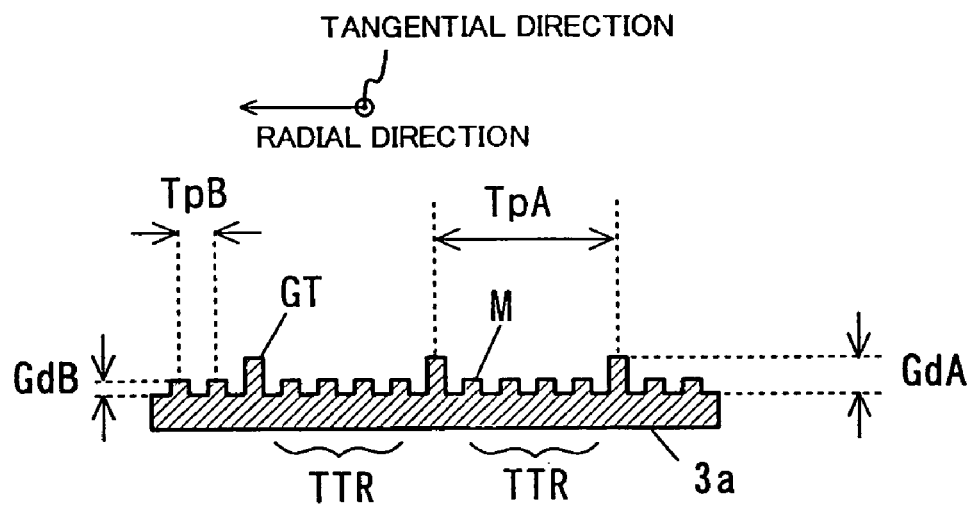
Figure 2:
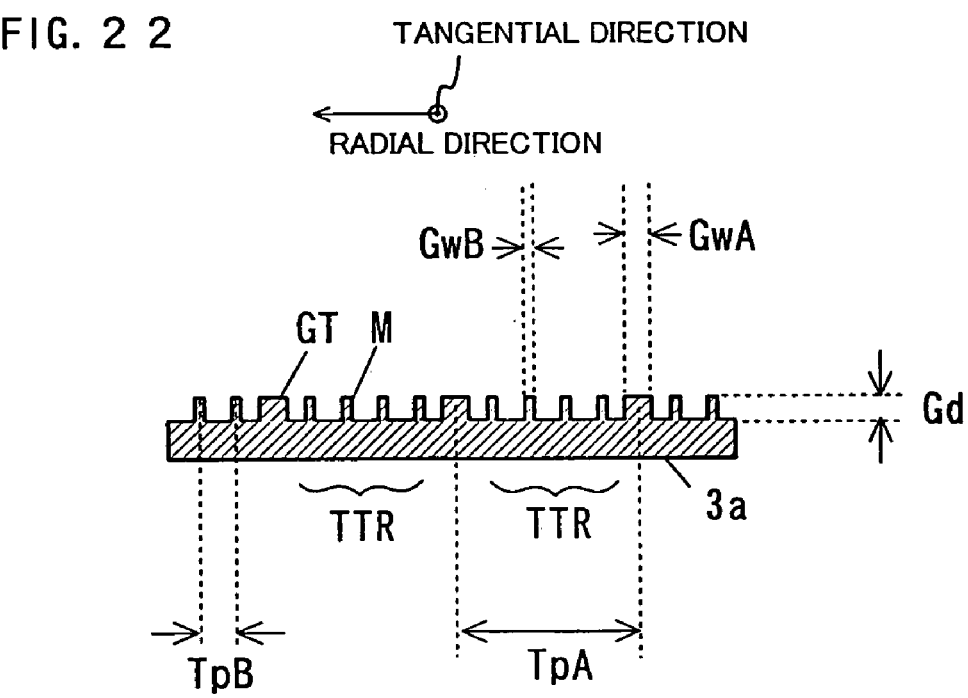
Figure 23:
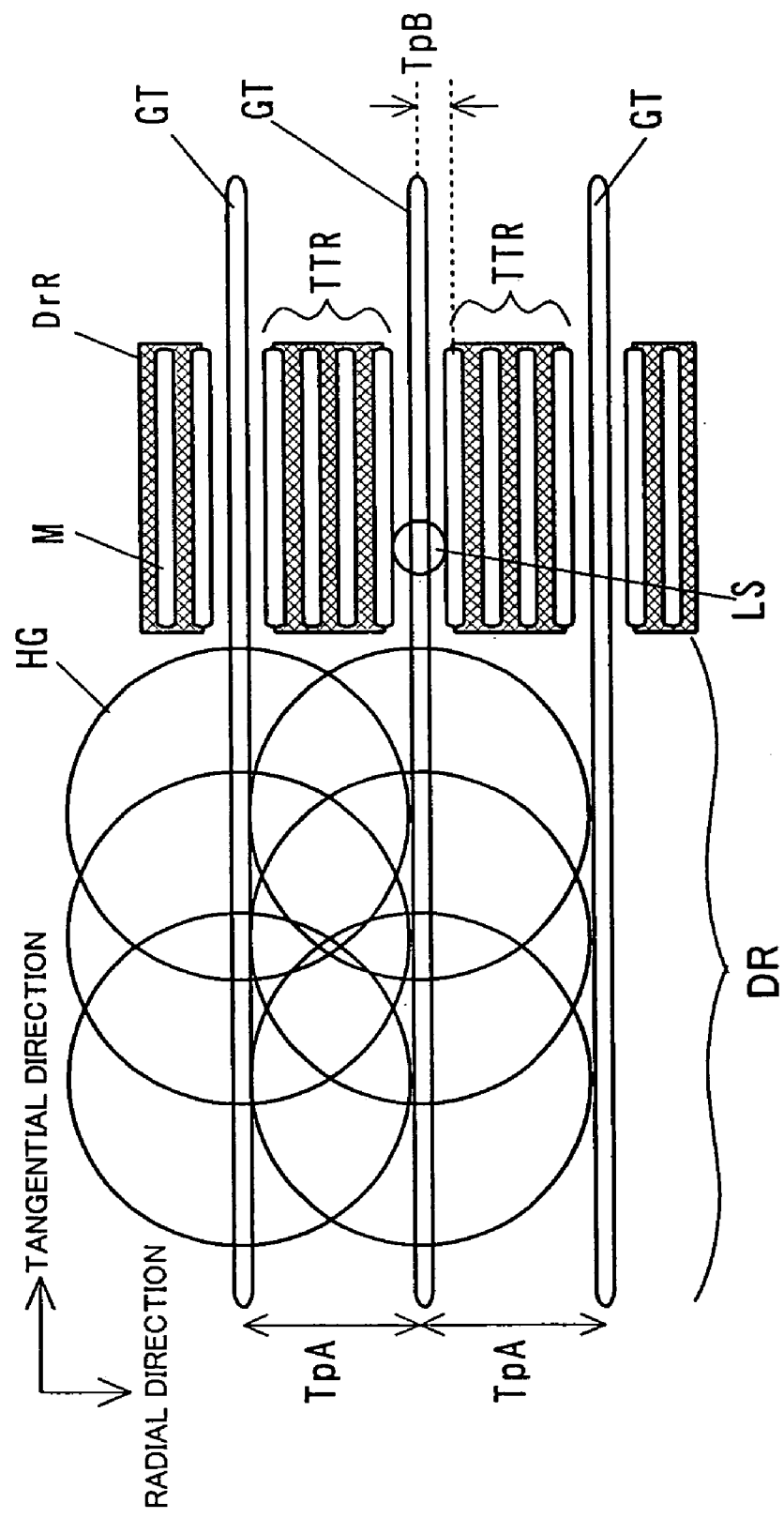
FIG. 23 is a partial plan view generally showing a hologram disc according to another embodiment of the present invention.

In the foregoing embodiment, as shown in FIG. 9 and FIG. 19, the example in that the tracks (short grooves) M of the guide track transfer region and the guide track GT have the same cross-sectional area is exemplified. In other words, as shown in FIG. 20, width Gw and the depth Gd of the short grooves M and the guide tracks GT are uniform. In contrast, as another embodiment, the short grooves M and the guide tracks GT are formed so that the changes of reflectivity occur in the guide track transfer region TTR and the guide track GT, as shown in FIGS. 21-23. In other words, the guide track GT and the short grooves M of the guide track transfer region TTR are formed so that the guide track GT and the short grooves M are different in modulation factor from each other on basis of a reflected return light, when the light beam spot moves in the guide track transfer region.

As shown in FIG. 21, one of examples of the recording medium has the guide track GT and the short grooves M whose the depths GdA and GdB are different from one another, i.e., GdA≧GdB, these are formed on the substrate 3a. This recording medium is the same as the foregoing embodiment except the guide track GT and the short grooves M are different in the depth from each other.

As shown in FIG. 22, another of examples of the recording medium has the guide track GT and the short grooves M whose the widths GwA and GwB are different from one another, i.e., GwA≧GwB, these are formed on the substrate 3a. This recording medium is the same as the foregoing embodiment except the guide track GT and the short grooves M are different in the width from each other.

FIG. 23 shows a further embodiment of a recording medium, in which the second reflecting portion DrR having a different reflectivity is formed within each guide track transfer region TTR on the substrate 3a, for example, to have a reflectivity lower than that of the data region DR, so that the surrounding of the guide track GT and the short grooves M are different in the reflectivity from the second reflecting portion DrR. This recording medium is the same as the foregoing embodiment except the surrounding of the short grooves M (guide track GT) is different in the reflectivity from the second reflecting portion DrR.

FIG. 24A shows changes of tracking error signals obtained by a series of the track jump operations of the light spot Ls during the passage of the guide track transfer region TTR relative to the recording media shown in FIGS. 21-23 by using the pickup of the recording and reproducing device shown in FIG. 10. FIG. 24B shows the tracking error signals caused by the light spot LS2 during the track jump operation at the data region DR.

As shown in FIG. 24A, the amplitude of the tracking error signals caused by the short grooves M periodically changes during the transfer of the light beam spot at the guide track GT. Since the amplitude of the short grooves M is reduced in comparison with that of the guide track GT, it is easily to detect the spot transfer operation from one track to the other.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on Japanese Patent Applications Nos. 2003-416806 and 2004-269401 which are hereby incorporated by reference.

What is claimed is:

1. A recording medium having a recording layer capable of be performed in recording or reproducing of information with light irradiation and carried with a substrate, comprising:
   a guide layer having guide tracks each followed by a light beam spot focused from an objective lens through the recording layer, the guide tracks disposed at a first pitch; and
   a guide track transfer region provided on said guide layer and having at least one or a plurality of shorter guide tracks in parallel with and between said guide tracks adjacent to each other in the extending direction of said guide track.

2. The recording medium according to claim 1, further comprising a track mark indicating existence of said guide track transfer region and disposed between said guide tracks adjacent to each other in the extending direction of said guide track.

3. The recording medium according to claim 1, wherein said guide track transfer region includes an address mark indicating address information.

4. The recording medium according to claim 1, wherein said track of said guide track transfer region disposed at second pitch larger than a spot diameter of said light beam.

5. The recording medium according to claim 4, wherein said spot diameter is in a diffraction limit defined by a wavelength of said light beam and a numerical aperture of said objective lens.

6. The recording medium according to claim 1, wherein said guide track is formed on said substrate spirally or spiroarcually or concentrically with respect to the center of said substrate.

7. The recording medium according to claim 1, wherein said guide track is formed in parallel on said substrate.

8. The recording medium according to claim 1, wherein said first pitch is 4/3 times or more as large as a spot diameter of said light beam.

9. The recording medium according to claim 1, wherein said recording layer made of a photo-sensitive material capable of preserving an optical interference pattern.

10. The recording medium according to claim 1, wherein said first pitch is set on basis of a multiplicity of hologram to be recorded to said recording layer in a direction perpendicular to said guide track.

11. The recording medium according to claim 1, wherein said guide layer and said recording layer are layered via a separation layer.

12. The recording medium according to claim 1, where said guide track and said track of said guide track transfer region are formed so that said guide track and said track are different in modulation factor from each other on basis of a reflected return light, when said light beam spot moves in said guide track transfer region.

13. The recording medium according to claim 12, where depths of said guide track and said track of said guide track transfer region are formed so that said guide track and said track are different in the depth from each other.

14. The recording medium according to claim 12, where widths of said guide track and said track of said guide track transfer region are formed so that said guide track and said track are different in the width from each other.

15. The recording medium according to claim 12, further comprising a second reflecting portion formed within said guide track transfer region so that said guide track and said track are different in reflectivity from each other.

16. A recording and reproducing method for a recording medium having a recording layer capable of be performed in recording or reproducing of information with light irradiation and carried with a substrate, comprising the steps of:
   providing a recording medium including a guide layer having guide tracks each followed by a light beam spot focused from an objective lens through the recording layer, the guide tracks disposed at a first pitch, and a guide track transfer region provided on said guide layer and having at least one or a plurality of shorter guide tracks in parallel with and between said guide tracks adjacent to each other in the extending direction of said guide track;
   moving the light beam spot within said guide track transfer region; and
   detecting a tracking error signal.

17. The recording and reproducing method according to claim 16, wherein said recording medium having a track mark indicating existence of said guide track transfer region and disposed between said guide tracks adjacent to each other in the extending direction of said guide track, and including an address mark indicating address information, and wherein the step of detecting the tracking error signal includes a step of detecting said track mark with a light beam irradiation, and a step of moving an irradiated position of said light beam along with said guide track transfer region.

18. The recording and reproducing method according to claim 16, where said guide track and said track of said guide track transfer region are formed so that said guide track and said track are different in modulation factor from each other on basis of a reflected return light, when said light beam spot moves in said guide track transfer region.

19. The recording and reproducing method according to claim 16, where depths of said guide track and said track of said guide track transfer region are formed so that said guide track and said track are different in the depth from each other.

20. The recording and reproducing method according to claim 16, where widths of said guide track and said track of said guide track transfer region are formed so that said guide track and said track are different in the width from each other.

21. The recording and reproducing method according to claim 16, where the recording medium includes a second reflecting portion formed within said guide track transfer region so that said guide track and said track are different in reflectivity from each other.

22. A recording device for a recording medium having a recording layer capable of be performed in recording or reproducing of information with light irradiation and carried with a substrate, comprising;

a support portion supporting a recording medium including a guide layer having guide tracks each followed by a light beam spot focused from an objective lens through the recording layer, the guide tracks disposed at a first pitch, and a guide track transfer region provided on said guide layer and having at least one or a plurality of shorter guide tracks in parallel with and between said guide tracks adjacent to each other in the extending direction of said guide track; and a detector portion for moving the light beam spot within said guide track transfer region to detect a tracking error signal.

23. The recording device according to claim 22, wherein said recording medium having a track mark indicating existence of said guide track transfer region and disposed between said guide tracks adjacent to each other in the extending direction of said guide track, and including an address mark indicating address information, and wherein the detector portion includes means for detecting said track mark with a light beam irradiation, and means for moving an irradiated position of said light beam along with said guide track transfer region.

24. A reproducing device for a recording medium having a recording layer capable of be performed in recording or reproducing of information with light irradiation and carried with a substrate, comprising;

a support portion supporting a recording medium including a guide layer having guide tracks each followed by a light beam spot focused from an objective lens through the recording layer, the guide tracks disposed at a first pitch, and a guide track transfer region provided on said guide layer and having at least one or a plurality of shorter guide tracks in parallel with and between said guide tracks adjacent to each other in the extending direction of said guide track; and a detector portion for moving the light beam spot within said guide track transfer region to detect a tracking error signal.

25. The reproducing device according to claim 24, wherein said recording medium having a track mark indicating existence of said guide track transfer region and disposed between said guide tracks adjacent to each other in the extending direction of said guide track, and including an address mark indicating address information, and wherein the detector portion includes means for detecting said track mark with a light beam irradiation, and means for moving an irradiated position of said light beam along with said guide track transfer region.

* * * * *